(12) United States Patent
Nandi et al.

(10) Patent No.: US 11,938,691 B2
(45) Date of Patent: Mar. 26, 2024

(54) THERMOPLASTIC PREPREG BASED FOAM PRODUCT

(71) Applicant: JOHNS MANVILLE, Denver, CO (US)

(72) Inventors: Malay Nandi, Littleton, CO (US); Mingfu Zhang, Littleton, CO (US); Lance Wang, Parker, CO (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 17/979,104

(22) Filed: Nov. 2, 2022

(65) Prior Publication Data

US 2023/0066342 A1 Mar. 2, 2023

Related U.S. Application Data

(62) Division of application No. 16/833,794, filed on Mar. 30, 2020, now Pat. No. 11,518,119.

(51) Int. Cl.
| | | |
|---|---|---|
| *B32B 5/18* | (2006.01) | |
| *B29B 11/16* | (2006.01) | |
| *B29B 15/12* | (2006.01) | |
| *B29C 70/50* | (2006.01) | |
| *B32B 5/24* | (2006.01) | |

(Continued)

(52) U.S. Cl.
CPC .............. *B29C 70/50* (2013.01); *B29B 11/16* (2013.01); *B29B 15/122* (2013.01); *B32B 5/18* (2013.01); *B32B 5/245* (2013.01); *B29K 2101/12* (2013.01); *B29K 2105/0872* (2013.01)

(58) Field of Classification Search
CPC .......... B32B 5/18; B32B 5/245; B32B 7/027; B32B 7/12; B32B 2307/304; B32B 2307/3065
See application file for complete search history.

(56) References Cited

U.S. PATENT DOCUMENTS 4,019,938 A    4/1977  Forrester
4,889,763 A *  12/1989 Brambach ................ B32B 5/24
                                                         428/419

(Continued)

FOREIGN PATENT DOCUMENTS

KR      10-0926834 B1      11/2009
WO       2014078496 A2      5/2014
WO    WO-2018215870 A1 *   11/2018  ............... B32B 5/18

*Primary Examiner* — Robert B Davis
(74) *Attorney, Agent, or Firm* — Robert D. Touslee

(57) ABSTRACT

A system for manufacturing a thermoplastic prepreg product includes a belt or conveyor, a prepreg applicator that positions a thermoplastic prepreg atop the belt or conveyor, a foam applicator that applies a foam mixture atop the thermoplastic prepreg, a heating mechanism that heats the thermoplastic prepreg and the foam mixture to cause the foam mixture to react atop the thermoplastic prepreg, and a laminator that is configured to press the thermoplastic prepreg and foam mixture to control a thickness of the resulting thermoplastic prepreg product. The thermoplastic prepreg includes a fabric, mat, or web of fibers and a thermoplastic material that is impregnated within the fabric, mat, or web of fibers. The thermoplastic material is formed from in situ polymerization of monomers and oligomers. The foam mixture includes an isocyanate, a polyol blend, and a blowing agent.

78 Claims, 2 Drawing Sheets

(51) Int. Cl.
*B32B 7/02* (2019.01)
*B29K 101/12* (2006.01)
*B29K 105/08* (2006.01)

(56) References Cited

U.S. PATENT DOCUMENTS

| | | |
|---|---|---|
| 5,698,304 A | 12/1997 | Brandon et al. |
| 10,132,597 B2 | 11/2018 | Pyles et al. |
| 10,239,566 B2 | 3/2019 | Bauer et al. |
| 10,414,921 B1 | 9/2019 | Dehni |
| 11,518,119 B2 | 12/2022 | Nandi et al. |
| 2016/0361894 A1 | 12/2016 | Ciuperca |
| 2017/0368792 A1 | 12/2017 | Faotto |
| 2021/0146653 A1 | 5/2021 | Ishikawa et al. |

\* cited by examiner

THERMOPLASTIC PREPREG BASED FOAM PRODUCT

CROSS REFERENCE TO RELATED APPLICATIONS

This application is a Division of pending U.S. application Ser. No. 16/833,794 filed Mar. 30, 2020. The entire contents of the above-identified application is incorporated by reference for all purposes.

BACKGROUND

Reinforced thermoplastic materials are gaining interest in the composite industry due to their superior properties such as impact resistance, thermoformability, and recyclability, as compared to thermoset sheets. Some thermoplastic reinforced materials are made with fabrics, which are formed by weaving fiber bundles or rovings together. Other thermoplastic reinforced materials are made with fiber mats that have randomly oriented fibers. Rigid polyurethane and polyisocyanurate foams are usually made in a continuous lamination process in which the foam ingredients are poured atop a facer material and the foam is allowed to rise and is cured in a heated laminator. Rigid polyurethane and polyisocyanurate foams are commonly used as insulation boards in various applications, such as homes, industrial buildings, and the like.

BRIEF SUMMARY

The embodiments described herein provide thermoplastic prepreg based foam products, and specifically systems and methods for making the same. According to one aspect, a system for manufacturing a thermoplastic prepreg product includes a belt or conveyor mechanism, a prepreg applicator, a foam applicator, a heating mechanism, and a laminator. The prepreg applicator is configured so that a thermoplastic prepreg is positioned atop the belt or conveyor mechanism and the belt or conveyor mechanism is configured to move the thermoplastic prepreg distally along the system. The thermoplastic prepreg includes a fabric, mat, or web of fibers, in which fibers of the fabric, mat, or web have an average length of 0.5 inches or greater and a thermoplastic material that is impregnated within the fabric, mat, or web of fibers. The thermoplastic material is polymerized from monomers and oligomers in which greater than 90% of the monomers or oligomers react to form the thermoplastic material.

The foam applicator is configured to apply a foam mixture atop the thermoplastic prepreg as the thermoplastic prepreg is moved passed the foam applicator via the belt or conveyor mechanism. The foam mixture comprises an isocyanate, a polyol blend, and a blowing agent. The heating mechanism is configured to heat the thermoplastic prepreg and the foam mixture to cause the foam mixture to react atop the thermoplastic prepreg and form a foam core bonded with the thermoplastic prepreg. The laminator is configured to press the thermoplastic prepreg and foam mixture to control a thickness of the thermoplastic prepreg product.

In some embodiments, the system also includes a second prepreg applicator that is configured so that a second thermoplastic prepreg is positioned atop the foam mixture after the foam mixture is applied atop the thermoplastic prepreg. In such embodiments, the foam mixture is sandwiched between opposing thermoplastic prepreg layers. The foam core may consist of polyurethane foam having a foam density of 2 pounds per cubic feet (pcf) or less and a thickness of 2 inches or more, or may consist of polyisocyanurate foam having a foam density of 2 pounds per cubic feet (pcf) or more and a thickness or 2 inches or less. In some embodiments, the thermoplastic material is fully impregnated through the fabric, mat, or web of fibers and forms a barrier such that the foam mixture does not impregnate or penetrate into fibers of the fabric, mat, or web of fibers when the foam mixture is applied atop the thermoplastic prepreg. In other embodiments, the thermoplastic material is partially impregnated within the fabric, mat, or web of fibers such that the thermoplastic material is impregnated within a first portion of fibers of the fabric, mat, or web of fibers and a second portion of fibers of the fabric, mat, or web of fibers is free of the thermoplastic material. In such embodiments, the system is configured to apply the foam mixture atop the thermoplastic prepreg so that the foam mixture impregnates or penetrates into the second portion of fibers of the fabric, mat, or web of fibers that is free of the thermoplastic material.

In some embodiments, the thermoplastic prepreg has a surface having a mean roughness of at least 5 micrometers, such that reacting the foam mixture atop the thermoplastic prepreg facilitates in mechanically coupling the foam core to the thermoplastic prepreg. In some embodiments, the system includes a primer applicator that is configured to apply a primer atop the thermoplastic prepreg prior to application of the foam mixture atop the thermoplastic prepreg. The primer facilitates in adhering the foam core to the thermoplastic prepreg. In some embodiments, the thermoplastic prepreg includes a thin adhesive film that is positioned atop the thermoplastic prepreg, in which the thin adhesive film promotes bonding between the thermoplastic prepreg and the foam core. In some embodiments, the thermoplastic material consists essentially of polyamide and the polyamide is adhered to the foam core without using a primer or other adhesion promoter.

In some embodiments, the system also includes a prepreg heating mechanism that is configured to heat the thermoplastic prepreg prior to application of the foam mixture atop the thermoplastic prepreg. In such embodiments, the prepreg heating mechanism may be configured to heat the thermoplastic prepreg above a glass transition temperature of the thermoplastic material and below a melting temperature of the thermoplastic material. The fabric, mat, or web of fibers may include glass fibers, carbon fibers, basalt fibers, metal fibers, ceramic fiber, natural fibers, synthetic organic fibers, aramid fibers, inorganic fibers, or combinations thereof. The thermoplastic material may include polyamides, such as polyamide 6 and polyamide 12, polyethylene terephthalate (PET), polybutylene terephthalate (PBT), polycarbonate (PC), thermoplastic polyurethane (TPU), poly(methyl methacrylate) (PMMA), or combinations thereof. The thermoplastic prepreg may have a void content of less than 3%.

According to another aspect, a method of forming a thermoplastic prepreg product includes positioning a thermoplastic prepreg atop a belt or conveyor and pouring a foam mixture onto a top surface of the thermoplastic prepreg. The thermoplastic prepreg includes a fabric, mat, or web of fibers, in which the fibers have an average length of 0.5 inches or greater and a thermoplastic material that is impregnated within the fabric, mat, or web of fibers. The thermoplastic material is polymerized from monomers and oligomers in which greater than 90% of the monomers or oligomers react to form the thermoplastic material. The foam mixture includes an isocyanate, a polyol blend, and a blowing agent. The method also includes heating the thermoplastic prepreg and the foam mixture to react the foam mixture on the top surface of the thermoplastic prepreg to form a foam core that is bonded with the thermoplastic prepreg and laminating the thermoplastic prepreg and the foam mixture as the foam mixture reacts to control a thickness of the resulting thermoplastic prepreg product.

In some embodiments, the method also includes applying a second thermoplastic prepreg atop the foam mixture after the foam mixture is poured onto the top surface of the thermoplastic prepreg so that the foam mixture is sandwiched between opposing thermoplastic prepreg layers. In some embodiments, the method further includes heating the thermoplastic prepreg prior to pouring the foam mixture onto the top surface of the thermoplastic prepreg. In such embodiments, the thermoplastic prepreg may be heated to above a glass transition temperature of the thermoplastic material and below a melting temperature of the thermoplastic material.

According to another aspect, a thermoplastic prepreg product includes a thermoplastic prepreg that forms a bottom layer of the thermoplastic prepreg product and a foam core positioned atop the thermoplastic prepreg and bonded to the thermoplastic prepreg. The thermoplastic prepreg includes a fabric, mat, or web of fibers, in which the fibers have an average length of 0.5 inches or greater and a thermoplastic material that is impregnated within the fabric, mat, or web of fibers. The thermoplastic material is polymerized from monomers and oligomers in which greater than 90% of the monomers or oligomers react to form the thermoplastic material. The foam core is reacted from an isocyanate and a polyol blend. The foam cores includes a blowing agent and a fire retardant.

In some embodiments, the thermoplastic prepreg also includes a second thermoplastic prepreg that is positioned atop the foam core and that is bonded to the foam core so that the foam core is sandwiched between opposing thermoplastic prepreg layers. In some embodiments, the foam core may consist of polyurethane foam having a foam density of 2 pounds per cubic feet (pcf) or less, an R-value of at least 5.7 per inch, and a compressive strength of at least 20 pounds per square inch (psi). In other embodiments, the foam core may consist of polyisocyanurate foam having a foam density of 2 pounds per cubic feet (pcf) or more, an R-value of at least 4.0 per inch, and a compressive strength of at least 25 pounds per square inch (psi). The thermoplastic material may be fully impregnated through the fabric, mat, or web of fibers and may form a barrier between the fabric, mat, or web of fibers and the foam core so that foam material of the foam core does not impregnate or penetrate into fibers of the fabric, mat, or web of fibers. Alternatively, the thermoplastic material may be partially impregnated within the fabric, mat, or web of fibers so that the thermoplastic material is impregnated within a first portion of fibers of the fabric, mat, or web of fibers and a second portion of fibers of the fabric, mat, or web of fibers is free of the thermoplastic material. In such embodiments, a foam material of the foam core may be impregnated within the second portion of fibers of the fabric, mat, or web of fibers.

The thermoplastic prepreg may have a surface having a mean roughness of at least 5 micrometers at an interface between the thermoplastic prepreg and the foam core. A primer may be positioned between the thermoplastic prepreg and the foam core. The primer may adhere the thermoplastic prepreg to the foam core. A thin adhesive film may be positioned between the thermoplastic prepreg and the foam core. The thin adhesive film may promote bonding between the thermoplastic prepreg and the foam core. The thermoplastic material may consist essentially of polyamide and the polyamide may be adhered to the foam core without using a primer or other adhesion promoter. The fabric, mat, or web of fibers may include glass fibers, carbon fibers, basalt fibers, metal fibers, ceramic fiber, natural fibers, synthetic organic fibers, aramid fibers, inorganic fibers, or combinations thereof. The thermoplastic material may comprise or consist of polyamides, such as polyamide 6 and polyamide 12, polyethylene terephthalate (PET), polybutylene terephthalate (PBT), polycarbonate (PC), thermoplastic polyurethane (TPU), poly(methyl methacrylate) (PMMA), or combinations thereof. The thermoplastic prepreg may have a void content of less than 3%.

BRIEF DESCRIPTION OF THE DRAWINGS

The present technology is described in conjunction with the appended figures.

Figure 1:
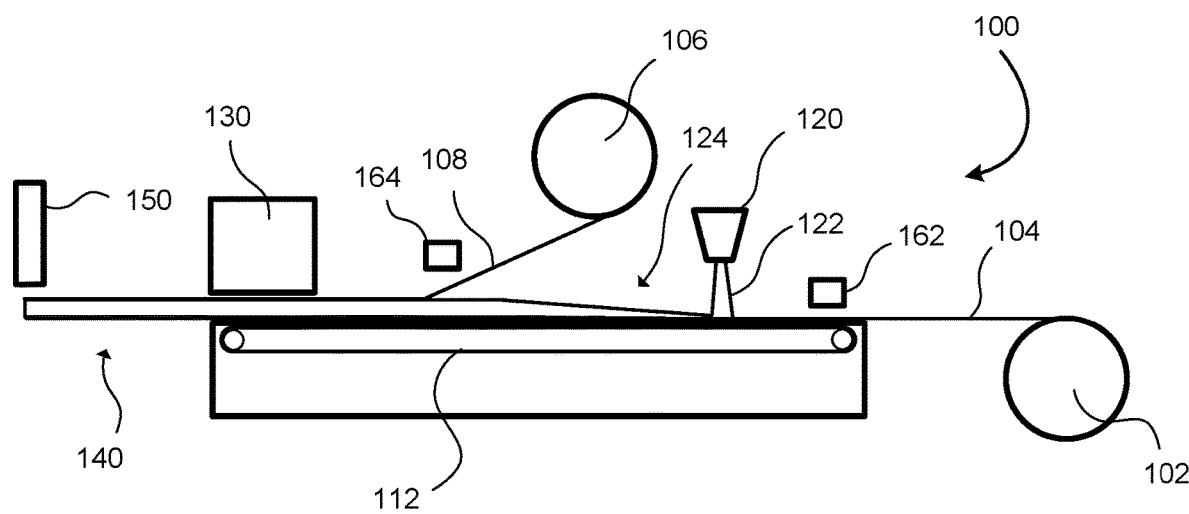
FIG. 1 illustrates a system for manufacturing a thermoplastic prepreg based foam product or foam composite board.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The embodiments described herein are directed to fully impregnated thermoplastic prepreg based foam products. The thermoplastic prepreg based foam products typically include a thermoplastic prepreg that is positioned on at least one side of the foam product. In many embodiments, the foam product includes a pair of thermoplastic prepregs that are positioned on opposite surfaces of the foam product. A foam material is typically positioned in between the thermoplastic prepregs and forms a foam core that is sandwiched between the thermoplastic prepregs. The thermoplastic prepregs typically include either continuous fibers in a fabric form, or long fibers (e.g., fibers having fiber lengths of 0.5 inches or more) in a mat or mesh form. The thermoplastic prepregs provide significant strength, stiffness, and impact resistance to the foam core that is sandwich between the thermoplastic prepregs. The thermoplastic prepreg based foam products are typically lightweight due to the low density of the foam core. The foam core may provide significant thermal insulation properties as well. The combination of high strength, lightweight, and thermal insulation value renders the thermoplastic prepreg based foam products ideal for structural insulation applications.

An exemplary foam material that may be used in the foam core is polyurethane or polyisocyanurate foam, which has been widely used to insulate roofs and walls of commercial and industrial buildings due to its excellent thermal insulation, flame resistance, and mechanical properties. The excellent flame resistance is due in part to the formation of an isocyanurate trimer during the foaming process. The foam density of the polyurethane or polyisocyanurate foam can vary over a wide range and is mainly controlled by an amount of blowing agent that is used during formulation of the foam. Low density foam, which is foam having a density of 2 lbs per cubic foot (pcf) or less, usually provides excellent thermal insulation performance due to having a high closed cell content and due to the blowing agent employed, such as pentane, which has a low thermal conductivity. High density foam, which is foam having a density greater than 2 pcf, provides excellent mechanical properties, such as excellent shear, compressive, and impact strength. In addition to polyurethane and polyisocyanurate foams, other foamed polymer materials can be used in the foam core as well, including polystyrene (XPS and EPS), polyolefin (PE and/or PP and/or EPDM foam), polyester, polyimide, polymethacrylamide, phenolic foam.

Conventional polyurethane or polyisocyanurate foam products do not include thermoplastic prepreg outer layers. The fiber reinforced thermoplastic prepreg outer layers that are used in the embodiments described herein result in the thermoplastic prepreg based foam products having substantially greater strength and stiffness properties in comparison with conventional polyurethane or polyisocyanurate foam products. In most instances, the foam material does not impregnate into the thermoplastic prepreg due to the thermoplastic material being fully impregnated within the prepreg. In contrast, conventional polyurethane or polyisocyanurate foam products commonly include a substantial amount of foam material impregnated into the fiber materials that are attached to the foam products, such as common wet-laid nonwoven fiber mat facer materials.

The substantially increased mechanical properties of the thermoplastic prepreg based foam products render the products suitable for structural applications. In contrast to conventional polyurethane or polyisocyanurate foam products, the thermoplastic prepreg based foam products described herein may be relatively difficult to cut and/or score. However, the thermoplastic prepreg based foam products may be substantially more durable and resistant to impact or other damage.

The term "thermoplastic" as used herein refers to polymer materials in which essentially no crosslinking, or minimal cross linking occurs. The negligible crosslinking enables the material to be heated to above a melting point of the thermoplastic material and formed into a desired shape. Thermoplastic materials as used herein may be formed via in situ polymerization of monomers or oligomers. Thermoplastic materials may include, but are not limited to, polyamides (including PA6 and PA12), polyethylene terephthalate (PET), polybutylene terephthalate (PBT), polycarbonate (PC), thermoplastic polyurethane (TPU), poly(methyl methacylate) (PMMA), or any combination thereof. The monomers and/or oligomers described herein may include any monomer or oligomer that polymerizes to form the thermoplastic materials described above, or any combination of these monomers or oligomers. The embodiments described herein may be particularly useful for use with TPU and/or polyamide materials.

In contrast, the term "thermoset" refers to polymer materials in which a substantial amount or degree of crosslinking occurs. In contrast to thermoplastic materials, thermoset materials are not able to be thermally formed into a desired shape after curing. Thermoset materials may be fully polymerized materials or partially polymerized b-stage resins or materials. Partially polymerized b-stage materials may increase the flowability of the resin since they are not fully crosslinked, but these materials often require special handling, such as refrigeration, and often have an expiration date upon which the b-stage material will begin to degrade. Partially polymerized b-stage materials also typically require the use of two release liners that are positioned on opposite sides of the composite and that minimize exposure of the b-stage material to air and/or human contact.

The term "fabric" as used herein describes woven fabrics and stitch-bonded non-crimp fabrics. The woven fabrics are materials that are produced by weaving multiple roving strands together. The term roving as used herein refers to a bundle of fibers that are positioned adjacent one another to form a rope, thread, or cord like component. In fabrics or woven materials, the roving strands are commonly woven so that a first plurality of strands extend in a first direction (e.g., weft direction) and a second plurality of strands extend in a second direction that is typically orthogonal to the first direction (e.g., warp direction). Various weaves may be used to form the fabrics contemplated herein, including: plain weaves, twill weaves, satin weaves, multiaxial weaves, or stitch bonding. The term mat as used herein refers to nonwoven materials. The terms web or mesh may also refer to nonwoven materials. Nonwoven fiber mats are commonly formed of fibers that are mechanically entangled, meshed together, or chemically bonded, rather than being woven or stitched. Web or mesh materials are similar to nonwoven materials except that the fibers may not be mechanically entangled or chemically bonded, prior to resin impregnation. Rather, the thermoplastic material may function as the matrix that binds the fibers together.

It should be understood that the terms fabric, mat, web, or mesh, may be used interchangeably in the embodiments described herein and that, unless specifically claimed, the disclosure is not limited to any one particular fiber-based product. Accordingly, it is contemplated that the terms may be replaced or changed in any of the embodiments described herein without departing from the intended scope of the description. Furthermore, the term "fabric, mat, web, or mesh" or "fiber-based product" may be substituted in the description or claims and is intended to cover any and all fiber-based products or components that are described or contemplated herein.

A common type of fiber that is used in rovings, fabrics, mats, or webs is glass fibers, although various other fibers could be used such as carbon fibers, basalt fibers, metal fibers, ceramic fibers, cellulosic fibers, natural fibers, synthetic organic fibers such as aramid fibers, inorganic fibers, polymer fibers, or combinations thereof. The fibers may be treated with a sizing composition including coupling agent(s) that promote bonding between fibers and the monomers and/or oligomers. For example, the fibers may be sized with one or more coupling agents that covalently bond the monomers and/or oligomers to the fibers. Exemplary coupling agents may include coupling-activator compounds having a silicon-containing moiety and an activator moiety. Specific examples of coupling-activator compounds include 2-oxo-N-(3-(triethoxysilyl)propyl)azepane-1-carboxamide. Exemplary coupling agents may also include blocked isocyanate coupling compounds having a silicon-containing moiety and a blocked isocyanate moiety. Exemplary coupling agents may also include coupling compounds having a functional group that may react with the thermoplastic material to form a covalent bond. Specific example of the coupling compounds having a functional group include silane coupling agents having amino, epoxy, or ureido functional groups.

The thermoplastic prepregs may be formed in a continuous or semi-continuous process via impregnation of a fabric, mat, or web of fibers with a reactive thermoplastic resin and in-situ polymerization to form thermoplastic resin matrix. Reactive thermoplastic resins comprise monomers or oligomers that can in situ polymerize to form thermoplastic polymers. The monomers or oligomers comprises lactams (such as caprolactam, laurolactam, etc.), lactones, cyclic butylene terephthalate (CBT), methyl methacrylate, precursors of thermoplastic polyurethane, or mixtures thereof. Exemplary systems for forming a thermoplastic prepreg are further described in U.S. application Ser. No. 15/944,249, filed Apr. 3, 2018, entitled "System for Producing a Fully Impregnated Thermoplastic Prepreg" and in U.S. application Ser. No. 16/172,153, filed Oct. 26, 2018, entitled "System for Producing a Fully Impregnated Thermoplastic Prepreg", the entire disclosures of which are incorporated by reference herein.

The thermoplastic prepregs may also be formed by melt impregnation of a fiber reinforcement with thermoplastic resin melts. The thermoplastic resins suitable for melt impregnation comprise polyolefins including polypropylene (PP) and high-density polyethylene (HDPE), polyamides including polyamide 6, polyethylene terephthalate (PET), polybutylene terephthalate (PBT), polycarbonate (PC), polyphthalamide (PPA), acrylonitrile-butadiene-styrene (ABS), PC/ABS, thermoplastic polyurethane (TPU), polyphenylene sulfide (PPS), acetal (polyoxymethylene or POM), polyethyleneimine (PEI), polyether ether ketone (PEEK), polyacrylonitrile, copolyacrylonitriles including poly(styrene-co-acrylonitrile) (SAN), or combinations thereof.

A fully impregnated thermoplastic prepreg can be fed continuously or discontinuously, such as in a molding process, through a system. Foam ingredients, such as a reaction mixture of isocyanate (A side) and polyols (B side), are directly poured onto the thermoplastic prepreg, typically as the thermoplastic prepreg is moved underneath a foam applicator. The foam rises or expands and forms a strong bond with the thermoplastic prepreg. A second thermoplastic prepreg is typically positioned atop the foam material after the foam materials is poured atop the first thermoplastic prepreg. In such embodiments, the foam material is sandwiched between two thermoplastic prepreg layers. The second thermoplastic prepreg may be applied atop the foam material before, during, or after the foam has risen and expanded. The foam material forms a strong bond with both the first and second thermoplastic prepregs. The thermoplastic prepreg(s) and foam material are typically fed through a heated laminator, which cures the foam material and presses on the thermoplastic prepreg(s) and foam material to control a thickness of the resulting foam product. One or more additives may be added to the foam core or thermoplastic prepregs. For example, the foam core and/or thermoplastic prepregs may include a fire retardant, filler, pigment, and the like. Production speeds for manufacturing the thermoplastic prepreg based foam product can exceed 100 feet per minute (fpm) and in some instances can exceed 200 fpm.

The resulting product is a thermoplastic prepreg based foam board, or more simply a foam composite board, that includes a foam core and a thermoplastic prepreg on one or both outer surfaces. The thermoplastic prepreg based foam board is lightweight and strong and may be particularly suitable for use in refrigerated trucks and railcars (e.g., wall/floor/ceiling), ocean liner container, recreational vehicles, wind energy (e.g., windmill blade), temporary/emergency housing, such as after a hurricane, and any structural application that desires high strength, lightweight, and/or thermal insulation.

Having described several aspects of the embodiments generally, additional features and aspects will be readily apparent in view of the description of the drawings provided herein below.

Referring to FIG. 1, illustrated is a system 100 for manufacturing a thermoplastic prepreg based foam product or foam composite board 140. For ease in describing the embodiments, the thermoplastic prepreg based foam product will be referred to hereinafter as a foam composite board 140. The system 100 is configured to operate in a continuous process. The term continuous process means that the materials (e.g., thermoplastic prepreg(s) and foam material) are constantly moved between the various components of the system 100 in an uninterrupted or minimally interrupted state. The continuous process results in the quick formation of the foam composite board 140. For example, production speeds of the foam composite board 140 can exceed 100 feet per minute (fpm) and in some instances can exceed 200 fpm.

The system 100 includes a roller 102 (hereinafter roller 102) about which a thermoplastic prepreg 104 is wound. The roller 102 functions as a prepreg applicator by unrolling the thermoplastic prepreg 104 atop a belt or conveyor mechanism 112. The belt or conveyor 112 is configured to move the thermoplastic prepreg 104 distally along the system. The thermoplastic prepreg 104 has a width that is generally equivalent to a width of the belt or conveyor 112, or slightly less than the width of the belt or conveyor 112. The thermoplastic prepreg 104 has a length that is defined by a desired length of the foam composite board 140. The thermoplastic prepreg 102 includes a fabric, mat, or web of fibers, in which fibers of the fabric, mat, or web have an average length of 0.5 inches or greater. The thermoplastic prepreg 104 also includes a thermoplastic material that is impregnated within the fabric, mat, or web of fibers. The thermoplastic material is formed from in situ polymerization of monomers and oligomers, in which greater than 90% of the monomers or oligomers react to form the thermoplastic material. The thermoplastic prepreg 104 typically has a void content of less than 3%.

In some embodiments, the roller 102 may be replaced by a mechanism that is designed to position separate thermoplastic prepreg sheets onto the belt or conveyor mechanism 112 at certain defined time intervals. The separate thermoplastic prepreg sheets may be positioned onto the belt or conveyor mechanism 112 so that adjacent thermoplastic prepreg sheets have minimal gaps between each sheet.

The roller 102 is positioned so that the thermoplastic prepreg 104 is unwound from the roller 102 and is moved or pulled to a foam applicator 120 that is configured to apply a foam mixture 122 atop the thermoplastic prepreg 104 as the thermoplastic prepreg 104 is moved passed the foam applicator 120 via the belt or conveyor 112. The foam applicator 120 is configured to apply the foam mixture 122 so that the foam mixture 122 extends across the entire width of the thermoplastic prepreg 104. The foam mixture typically includes an A side material (e.g., an isocyanate) and a B side material (e.g., a polyol blend) that react to form the foam material. The A side material and B side material may vary based on the foam material that is desired to be formed. The mixture 122 may include other materials, such as a blowing agent, fire retardant, filler material, and the like. The mixture 122 is poured directly onto the thermoplastic prepreg 104. The foam 124 rises or expands atop the thermoplastic prepreg 104 and forms a strong bond with the thermoplastic prepreg.

Various means may be employed to promote bonding between the thermoplastic prepreg 104 and the foam material 124. In one embodiment, a top surface of the thermoplastic prepreg 104 may have a mean roughness of at least 5 micrometers. Mean Roughness (Ra) is an arithmetic average value of the filtered roughness profile determined from deviations about the center line within the evaluation length, which may be calculated using a known mathematical equation. In such embodiments, reacting the foam mixture 122 atop the thermoplastic prepreg 104 may facilitate in mechanically coupling the foam material 124, or foam core, to the thermoplastic prepreg 104. The roughness in the top surface may be induced, imprinted, or otherwise transferred onto the top surface, and the bottom surface if desired, by employing a belt or conveyor having a mirrored roughness and by pressing the top or bottom surface during manufacturing of the thermoplastic prepreg 104. For example, the belts or conveyors in the systems described in the '249 and '153 Applications incorporated by reference herein may have a surface that mirrors a desired roughness of the top or bottom surface of the thermoplastic prepreg 104. In other embodiments, the roughness may be induced in a post manufacturing process by using a grinding or abrasion mechanism.

In another embodiment, a primer may be applied to the top surface of the thermoplastic prepreg 104 to facilitate in adhering the foam material 124 to the thermoplastic prepreg 104. In such embodiments, the system 100 may include a primer applicator (not shown) that is configured to apply a primer atop the thermoplastic prepreg 104 prior to application of the foam mixture 122 to the thermoplastic prepreg 104. In other instances, the primer could be applied elsewhere, such as during manufacturing of the thermoplastic prepreg 104 or shortly thereafter. In yet another embodiment, a thin adhesive film may be applied atop the thermoplastic prepreg 104. The thin adhesive film may promote bonding between the thermoplastic prepreg 104 and the foam material 122. The system 100 may include an adhesive film applicator (not shown) or the adhesive film may be pre-applied to the thermoplastic prepreg 104. Exemplary primers include Duralon, which is manufactured by Duromer Products Pty Ltd, and a polyamide primer manufactured by Tamiya. An exemplary adhesive film includes BONDiT, which is manufactured by RELTEK.

In a specific embodiment, the thermoplastic material comprises, consists of, or consists essentially of polyamide and the polyamide is adhered to the foam material 124 without using a primer or other adhesion promoter. Polyamide is a difficult substrate to bond due to its hydrophobicity and poor surface wettability (low surface energy). In the isocyanurate range described herein, it would be expected that polyamide would not adhere well to the foam material 124 since it is known that the adhesion of polyamide to isocyanurate is not significant. More specifically, the amount of polyurethane in the foam material 124 is not overly significant because of the addition of isocyanurate for rigidity and fire resistance purposes, which significantly weakens the adhesion between the thermoplastic prepreg 104 and foam material 124. Surprisingly, however, in formation of a polyamide prepreg based foam composite board 140 as described herein, the polyamide adhered exceptionally well to the foam material 124 so that a primer or other adhesive promoter was not required. To enhance the ability of the polyamide to bond to the foam material 124, the polyamide may be surface treated, such as via a plasma or corona treatment. In applications where enhanced fire resistance is not a concern, the amount of isocyanurate can be reduced and/or the amount of polyurethane can be increased to enhance the bonding between the thermoplastic prepreg 140 and the foam material 124.

In some embodiments, the thermoplastic material is fully impregnated through the fabric, mat, or web of fibers of the thermoplastic prepreg 104. In such embodiments, the thermoplastic material forms a barrier so that the foam mixture 122 does not impregnate or penetrate into fibers of the fabric, mat, or web of fibers when the foam mixture 122 is applied atop the thermoplastic prepreg 104. Stated differently, when the thermoplastic material is fully impregnated through thermoplastic prepreg's fabric, mat, or web of fibers, there is no impregnation of the foam material 124 into the fabric, mat, or web of fibers so that the fibers remain free of the foam material 124 and do not contact, or minimally contact, the foam material 124.

In other embodiments, the thermoplastic material of the thermoplastic prepreg 104 may partially impregnate the fabric, mat, or web of fibers. In such embodiments, the thermoplastic material may be impregnated within a first fiber portion of the fabric, mat, or web of fibers and a second fiber portion of fibers of the fabric, mat, or web of fibers may be free of the thermoplastic material. The first fiber portion of the fabric, mat, or web of fibers may have a void content of less than 3% as described herein while the second fiber portion is free of thermoplastic material entirely. In such embodiments, the second fiber portion may be positioned atop the belt or conveyor 112 so that the foam mixture 122 is applied or poured atop the second fiber portion and impregnates or penetrates into fibers of the second fiber portion. Since the second fiber portion of the fabric, mat, or web of fibers is free of the thermoplastic material, the second fiber portion does not include a barrier material that prevent impregnation or penetration of the foam mixtures 122 and/or foam material 124 into the fibers. Impregnation of the foam mixture 122 and/or foam material 124 into the second fiber portion of the fabric, mat, or web of fibers may promote bonding between the thermoplastic prepreg 104 and foam material 124 by mechanically coupling the two materials. A partially impregnated thermoplastic prepreg may be preferred because it enables a physical bonding or coupling of the thermoplastic prepreg 104 and foam material 124.

The system 100 typically includes a second roller 106 that functions as a second prepreg applicator by applying or positioning a second thermoplastic prepreg 108 atop the foam mixture 122 after the foam mixture 122 is applied atop the first thermoplastic prepreg 104. In such embodiments, the system 100 sandwiches the foam mixture 122 between opposing thermoplastic prepreg layers, 104 and 108. The second thermoplastic prepreg 108 typically has a width that mirrors the width of the first thermoplastic prepreg 104 so that the second thermoplastic prepreg 108 extends across an entire width of the foam material 124 and across an entire length of the resulting foam composite board 140. The second thermoplastic prepreg 108 may have a composition and/or construction (e.g., fully or partially impregnated) as described herein and/or that mirrors or matches a composition and/or construction of the first thermoplastic prepreg 104. In other embodiments, the first thermoplastic prepreg 104 and the second thermoplastic prepreg 108 may differ in composition and/or construction so that the foam material 124 is disposed between differing thermoplastic prepreg outer layers. The first thermoplastic prepreg 104 may be designed to provide a first set of properties (e.g., increased strength) while the second thermoplastic prepreg 108 is designed to provide a second set of properties (e.g., bondability). In some embodiments, the foam composite board 140 may include a thermoplastic prepreg 104 on one of its surfaces and an entirely different outer material on the opposite surface. For example, the different outer material could be a nonwoven material, a paper facer, an aluminum foil facer, Kraft paper laminate facer, a scrim, a metal panel, and the like.

The system 100 may include a prepreg heating mechanism 162 that is configured to heat the thermoplastic prepreg 104 prior to application of the foam mixture 122 atop the thermoplastic prepreg 104. In some instances, the thermoplastic prepreg 104 may be heated to around 100 Fahrenheit or more to ensure that the foam mixture 122 is not applied to a cold surface. In some instances, the prepreg heating mechanism 162 may be configured to heat the thermoplastic prepreg 104 to near or above a glass transition temperature of the thermoplastic material while maintaining the temperature below a melting temperature of the thermoplastic material. Heating the thermoplastic prepreg 104 to near or above the glass transition temperature may be particularly useful when it is desired to soften the thermoplastic material in order to remove any shape memory that may be induced during manufacturing or transport of the thermoplastic prepreg 104. For example, a curl or bend in the thermoplastic prepreg 104 may be induced due to storage and/or transport of the thermoplastic prepreg 104. In such instances, it may be beneficial to soften the thermoplastic prepreg 104 to remove or minimize the shape memory and thereby minimize or prevent delamination of the thermoplastic prepreg 104 and foam material 124 after manufacturing. The heating mechanism 162 may heat the thermoplastic prepreg 104 to near or above about ⅔ of the melting temperature of the thermoplastic material. In some embodiments, the heating mechanism 162 may heat the thermoplastic prepreg 104 to between 100 and 400 degrees F., and preferably between 200 and 300 degrees F.

The system 100 may also include a second heating mechanism 164 that is configured to heat the second thermoplastic prepreg 108 in a manner similar to the first heating mechanism 164. In such embodiments, the system 100 may heat both the first and second thermoplastic prepregs, 104 and 108. In other instances, the system 100 may only be configured to heat the first or second thermoplastic prepreg, 104 and 108, as needed.

Heating the thermoplastic prepreg 104 to the temperatures described herein is substantially higher than typical ranges that are used for conventional foam composite board outer layer materials, such as conventional facer materials, since these higher temperature ranges do not provide any benefit for conventional foam composite board outer materials. Heating the thermoplastic prepreg 104 to these higher temperatures may offer other beneficial properties, such as enhanced adhesion or reduced reaction time of the foam material.

The system 100 also includes a heating mechanism that is configured to heat the thermoplastic prepreg(s), 104 and/or 108, and the foam mixture 122 to cause the foam mixture 122 to react atop the thermoplastic prepreg 104 and form the foam material 124 or foam core that is bonded with the thermoplastic material. The system further includes a laminator 130 that is configured to press the thermoplastic prepreg 102 and foam mixture 122 to control a thickness of the resulting foam composite board 140. The heating mechanism and laminator 130 are typically combined into a single system, although separate systems or components may be used as desired. The heating mechanism is typically heated to between 130 and 190 Fahrenheit, which causes the foam mixture 122 to react atop the thermoplastic prepreg 104.

The system 100 may also include a cutting mechanism 150 that is designed to cut the foam composite board 140 that exits the laminator 130. The cutting mechanism 150 cuts the foam composite board 140 to a desired length. The system may also include a cooling mechanism (not shown) that is designed to cool the foam composite board 140 prior to cutting the foam composite board 140 with the cutting mechanism 150. The system 100 also typically includes one or more guide components (not shown) that route or direct the thermoplastic prepregs, 104 and 108, from the respective rollers, 102 and 106, to the components of the system 100. The system 100 may include additional guides (not shown) that are positioned distally of the laminator 130 that guide or route the foam composite board 140 to the cutting mechanism 150 and elsewhere as required.

The foam composite board 140 that is produced via the system 100 may include a high density or low density foam depending on the intended application of the foam composite board 140. In one embodiment, the foam composite board 140 has a foam core that consists of polyurethane foam having a foam density of 2 pounds per cubic feet (pcf) or less and a thickness of 2 inches or more. This foam composite board 140 may be particularly suited for applications that require appreciable thermal insulation properties. In another embodiment, the foam composite board 140 may have a foam core that consists of polyisocyanurate foam having a foam density of 2 pounds per cubic feet (pcf) or more and a thickness or 2 inches or less. This foam composite board 140 may be particularly suited for applications where enhanced structural property is required and thermal insulation may be of little concern or of secondary concern. Other foam composite board 140 compositions and/constructions and other foam core materials may be formed with the system 100 described herein. For example, the foam composite board may be a thin board (i.e., less than 2 inches) that includes a low density foam (i.e., 2 pcf or less) or may be a thick board (i.e., greater than 2 inches) that includes a high density foam (i.e., 2 pcf or more). The foam composite board may have a flame spread index (FSI) of 25 or less, as determined according to ASTM E84 test method. In addition, although the system 100 is described as using a thermoplastic prepeg, 104 and/or 108, in some embodiments it may be preferred to use a thermoset prepreg, which is a fabric, mat, or web of fibers that is impregnated with a thermoset material. The thermoset prepreg may be unwound from the respective roller(s) and passed through the system as described herein. The use of a thermoset prepreg may be particularly useful when the foam core is made of polyurethane. The polyurethane foam may have a chemistry that bonds easily with the thermoset prepreg material and the combination of these materials may be preferred in some applications.

Figure 2:
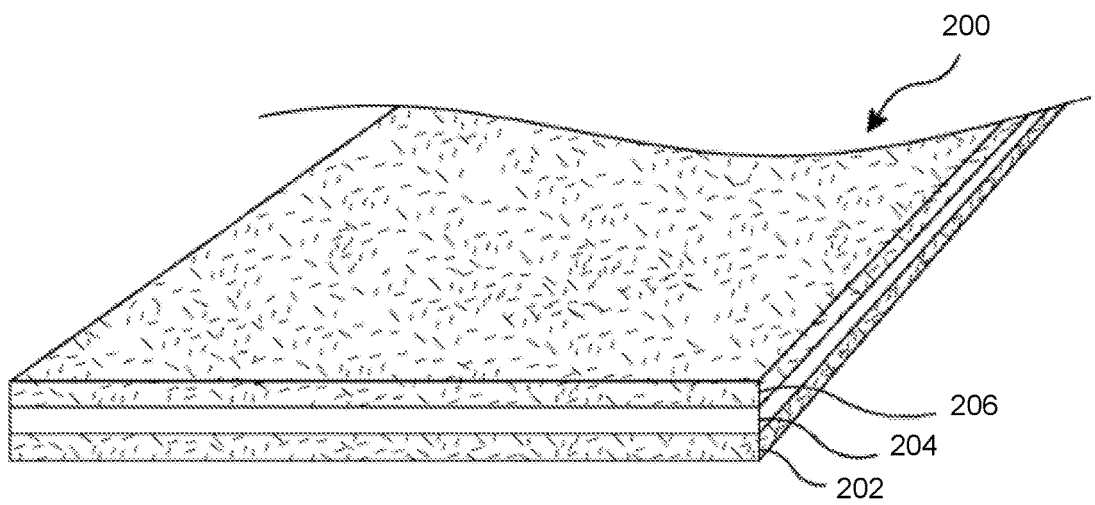
FIG. 2 illustrates a foam composite board that is manufactured using the system of FIG. 1.

Referring to FIG. 2, illustrated is a foam composite board 200 (i.e., a thermoplastic prepreg product) that includes a thermoplastic prepreg 202 forming a bottom layer of the foam composite board 200. The foam composite board 200 has a length and a width that is defined by the system that manufactured the foam composite board 200, and more commonly that is defined based on an intended application of the foam composite board 200. The thermoplastic prepreg 202 includes a fabric, mat, or web of fibers, in which the fibers have an average length of 0.5 inches or greater. For illustrative purposes, the thermoplastic prepreg 202 is illustrated as having dispersed fibers, although the fibers may be in the form of a fabric, mat, web, or other configuration as a person of skill will readily understand.

A thermoplastic material is impregnated within the fabric, mat, or web of fibers such that the thermoplastic prepreg 202 has a void content of less than 3%. The thermoplastic material is formed via in situ polymerization of monomers and oligomers in which greater than 90% of the monomers or oligomers react to form the thermoplastic material. A foam core 204 is positioned atop the thermoplastic prepreg 202 and is bonded to the thermoplastic prepreg so that the foam core 204 extends across the length and width of the thermoplastic prepreg 202. The foam core is formed from an isocyanate and a polyol blend. In some embodiments, the polyol blend may have a functionality of at least 2.0 and/or a hydroxyl number in the range of 100 to 1200. The foam core 204 may also include a blowing agent, a fire retardant, and/or other additives as desired. In some embodiments, the isocyanate and the polyol blend are reacted so that the foam core 204 has an isocyanate index equivalent between 100 and 350, while in other embodiments the foam core 204 has an isocyanate index greater than 300. In some embodiments, the foam composite board 200 includes a second thermoplastic prepreg 206 that is positioned atop the foam core 204 and that is bonded to the foam core so that the foam core 204 is sandwiched between opposing thermoplastic prepreg layers, 202 and 206. The second thermoplastic prepreg 206 extends across a length and width of the foam core 204.

In one embodiment, the foam core 204 is a low density foam. For example, the foam core may consist of, or consist essentially of, polyurethane foam having a foam density of 2 pounds per cubic feet (pcf) or less, an R-value of at least 5.7 per inch, and a compressive strength of at least 20 pounds per square inch (psi). In another embodiment, the foam core 204 is a high density foam. For example, the foam core may consist of, or consist essentially of, polyisocyanurate foam having a foam density of 2 pounds per cubic feet (pcf) or more, an R-value of at least 4.0 per inch, and a compressive strength of at least 25 pounds per square inch (psi). Regardless of the use of a high or low density foam, the foam composite board 200 may have a compressive strength of at least 20 psi.

In some embodiment, the thermoplastic material of at least one of the thermoplastic prepregs, 202 and 206, is fully impregnated through the fabric, mat, or web of fibers and forms a barrier between the fabric, mat, or web of fibers and the foam core 204 such that foam material of the foam core 204 does not impregnate or penetrate into fibers of the fabric, mat, or web of fibers. The thermoplastic material may fully impregnate the first thermoplastic prepreg 202, the second thermoplastic prepreg 206, or both thermoplastic prepregs as desired. In such an embodiment, the foam material essentially only contacts the thermoplastic material (e.g., polyamide) on the surface of the thermoplastic prepreg, 202 and 206, and is bonded therewith so that the fibers of the thermoplastic prepreg do not contact, or minimally contact, the thermoplastic material. The thermoplastic material may bond directly to the polyamide as described herein, or an adhesion promoter may be used to increase the adhesion between the materials.

In another embodiment, the thermoplastic material of at least one of the thermoplastic prepregs, 202 and 206, is partially impregnated within the fabric, mat, or web of fibers. In such embodiments, the thermoplastic material may only be impregnated within a first portion of fibers of the fabric, mat, or web of fibers so that a second portion of fibers of the fabric, mat, or web of fibers remains free of the thermoplastic material. The thermoplastic material may partially impregnate into the first thermoplastic prepreg 202, the second thermoplastic prepreg 206, or both thermoplastic prepregs as desired. When the thermoplastic material is partially impregnated within the fabric, mat, or web of fibers, the second portion of fibers of the fabric, mat, or web of fibers is typically positioned adjacent the foam core 204. In such embodiments, the foam material of the foam core 204 may be impregnated, or otherwise positioned, within the second portion of fibers of the fabric, mat, or web of fibers. The impregnation of the foam material into the fibers of the second portion of the fabric, mat, or web of fibers may enhance coupling or bonding of the thermoplastic prepreg(s), 202 and/or 206, and the foam core 204. In other embodiments, the first portion of fibers of the fabric mat or web of fibers may be positioned adjacent the foam core 204 and the second portion of fibers of the fabric, mat, or web of fibers may be positioned opposite the foam core 204. In such embodiments, the second portion of fibers of the fabric, mat, or web of fibers may be impregnated with another material, or may be used for another purpose, such as bonding the foam composite board 200 with another component or material, absorbing a liquid, providing a desired outer surface, and the like. In some embodiments, one of the thermoplastic prepregs (e.g., the first thermoplastic prepreg 202) may be fully impregnated with a thermoplastic material while the other thermoplastic prepreg (e.g., the second thermoplastic prepreg 206) is partially impregnated with a thermoplastic material. The thermoplastic materials that are used in the first and second thermoplastic prepregs, 202 and 206, may be the same material, a different material, or a combination of materials as desired.

In some embodiments, a surface of the thermoplastic prepreg (i.e., the surface at an interface between the thermoplastic prepreg and the foam core 204) has a mean roughness of at least 5 micrometers. The roughened surface may be induced during formation of the thermoplastic prepreg or subsequent to formation of the thermoplastic prepreg. A mean roughness may be induced in a top surface of the first thermoplastic prepreg 202, a bottom surface of the second thermoplastic prepreg 206, or in both the top surface of the first thermoplastic prepreg 202 and the bottom surface of the second thermoplastic prepreg 206.

In some embodiments a primer may be positioned between at least one of the thermoplastic prepregs, 202 and 206, and the foam core 204. The primer may adhere the thermoplastic prepreg(s), 202 and/or 206, to the foam material of the foam core 204. In another embodiment, a thin adhesive film may be positioned between at least one of the thermoplastic prepregs, 202 and 206, and the foam core 204. The thin adhesive film may promote bonding between the thermoplastic prepreg(s), 202 and/or 206, and the foam material of the foam core 204. In some embodiments, a combination of a primer, a thin adhesive film, and/or a roughened surface may be used to promote bonding between the thermoplastic prepreg(s), 202 and/or 206, and the foam material of the foam core 204. In contrast, in a specific embodiment, the thermoplastic material may consist of, or consist essentially of, polyamide, and the polyamide may be adhered to the foam core 204 without using a primer or other adhesion promoter.

The fibers of the first thermoplastic prepreg 202 and the second thermoplastic prepreg 206 may include any of the fiber materials described herein, or any other fibers materials. The fibers of the first thermoplastic prepreg 202 and the second thermoplastic prepreg 206 may be the same type of fibers, different types of fibers, or a combination of fibers as desired. Similarly, the thermoplastic material of the first thermoplastic prepreg 202 and the second thermoplastic prepreg 206 may include any of the thermoplastic materials described herein, or any other suitable thermoplastic material. The thermoplastic material of the first thermoplastic prepreg 202 and the second thermoplastic prepreg 206 may be the same thermoplastic material, different thermoplastic materials, or a combination of thermoplastic materials as desired. The foam material of the foam core 204 may be any of the foam materials described herein, or any other suitable foam material.

In some embodiments, the first thermoplastic prepreg 202 and/or the second thermoplastic prepreg 206 may be replaced by a thermoset prepreg. In such embodiments, the foam core 204 may be sandwiched between two thermoset prepreg layers, or may include a single thermoset prepreg positioned on one of the exterior surfaces. In some embodiments, the foam core 204 may be sandwiched between a thermoset prepreg and a thermoplastic prepreg. The use of a thermoset prepreg layer, or opposing thermoset prepreg layers, may be particularly useful when the foam core 204 is made of polyurethane. The polyurethane foam may have a chemistry that bonds easily with the thermoset prepreg layer(s) and may be preferred depending on the intended application of the foam composite board 200.

Figure 3:
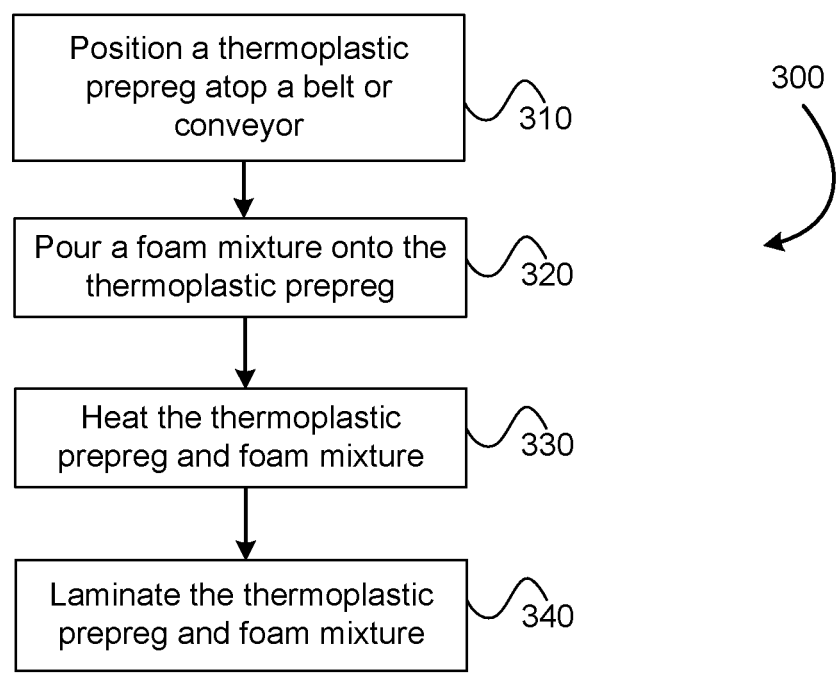
FIG. 3 illustrates a method of forming a thermoplastic prepreg based foam product or foam composite board.

Referring to FIG. 3, illustrated is a method 300 of forming a thermoplastic prepreg product or foam composite board. At block 310, a thermoplastic prepreg is positioned atop a belt or conveyor. The thermoplastic prepreg has a length and a width and includes a fabric, mat, or web of fibers, in which the fibers have an average length of 0.5 inches or greater and a thermoplastic material that is impregnated within the fabric, mat, or web of fibers. The thermoplastic prepreg has a void content of less than 3% and the thermoplastic material is formed via in situ polymerization of monomers and oligomers in which greater than 90% of the monomers or oligomers react to form the thermoplastic material. In some embodiments, a thermoset prepreg may be used instead of a thermoplastic prepreg. A thermoset prepreg may be employed when the foam core is a made of polyurethane. At block 320, a foam mixture is poured onto a top surface of the thermoplastic prepreg so that the foam mixture extends across the length and width of the thermoplastic prepreg. The foam mixture includes or consists of an isocyanate, a polyol blend, and a blowing agent. At block 330, the thermoplastic prepreg and the foam mixture are heated to react the foam mixture on the top surface of the thermoplastic prepreg to form a foam core that is bonded with the thermoplastic prepreg. At block 340, the thermoplastic prepreg and the foam mixture are laminated as the foam mixture reacts to control a thickness of the resulting thermoplastic prepreg product. Blocks 330 and 340 may be performed simultaneously via a heated laminator, or may be performed separately by different devices or mechanisms.

In some embodiments, the method also includes applying a second thermoplastic prepreg atop the foam mixture after the foam mixture is poured onto the top surface of the thermoplastic prepreg. In such embodiments, the foam mixture is sandwiched between opposing thermoplastic prepreg layers. In some embodiments, a thermoset prepreg may be positioned atop the foam mixture after the foam mixture is poured onto the top surface of the thermoplastic prepreg or another thermoset prepreg. The second thermoplastic prepreg typically extends across a length and width of the foam mixture and the first thermoplastic prepreg. The method may be used to form a low density foam product, such as a foam composite board in which the foam core consists of, or consists essentially of, polyurethane foam having a foam density of 2 pounds per cubic feet (pcf) or less and a thickness of 2 inches or more. The method may also be used to form a high density foam product, such as a foam composite board in which the foam core consists of, or consists essentially of, polyisocyanurate foam having a foam density of 2 pounds per cubic feet (pcf) or more and a thickness of 2 inches or less. The method may further be used to produce foam composite boards having different foam core materials or compositions as desired.

In some embodiments, the thermoplastic material is fully impregnated through the fabric, mat, or web of fibers and forms a barrier such that the foam mixture does not impregnate or penetrate into fibers of the fabric, mat, or web of fibers when the foam mixture is poured onto the top surface of the thermoplastic prepreg. In other embodiments, the thermoplastic material is partially impregnated within the fabric, mat, or web of fibers such that the thermoplastic material is impregnated within a first portion of fibers of the fabric, mat, or web of fibers and a second portion of fibers of the fabric, mat, or web of fibers remains free of the thermoplastic material. In such embodiments, the first portion of fibers of the fabric, mat, or web of fibers may have a void content of less than 3% and the foam mixture may be poured onto the top surface of the thermoplastic prepreg so that the foam mixture impregnates or penetrates into fibers of the second portion of fibers of the fabric, mat, or web of fibers.

The top surface of the thermoplastic prepreg may have a mean roughness of at least 5 micrometers such that reacting the foam mixture on the top surface of the thermoplastic prepreg facilitates in mechanically coupling the foam core to the thermoplastic prepreg. In some embodiments, the method may additionally include applying a primer to the top surface of the thermoplastic prepreg prior to pouring the foam mixture onto the top surface of the thermoplastic prepreg. The primer may facilitate in adhering the foam core to the thermoplastic prepreg. In contrast or in addition, the method may additionally include applying a thin adhesive film on the top surface of the thermoplastic prepreg prior to pouring the foam mixture onto the top surface of the thermoplastic prepreg. The thin adhesive film may also promote bonding between the thermoplastic prepreg and the foam core. In contrast, the thermoplastic material may consist essentially of polyamide and the polyamide may adhere to the foam core without using a primer or other adhesion promoter.

In some embodiments, the method may additionally include heating the thermoplastic prepreg prior to pouring the foam mixture onto the top surface of the thermoplastic prepreg. In such embodiments, the thermoplastic prepreg may be heated to above a glass transition temperature of the thermoplastic material and below a melting temperature of the thermoplastic material.

Example foam mixtures that may be used in forming a foam composite board are provided below. Numeric values of the A side (i.e., isocyanate) and B side (i.e., polyol blend) materials are provided along with numeric values for the foam mixture. A high density formulation that produces a roughly 0.5 inch foam core may be as follows:

| Component | Parts |
|---|---|
| Polyol | 100 |
| Cat 1 | 2 |
| Cat 2 | 0.3 |

| Component | Parts |
| --- | --- |
| Cat 3 | 0.3 |
| Surfactant | 2.0 |
| Pentane 50/50 i/n | 3.75 |
| Water | 0.4 |
| Total "B" | 108.75 |
| Total "A" (Isocyanate) | 174.45 |
| Total A + B | 283.20 |
| Index | 3.00 |
| Ratio | 1.60 |
| Total Batch Size (g) | 250.00 |

In the table above, the A side material comprised or consisted of an isocyanate that included roughly 174.45 parts. The B side material consisted of roughly 100 parts of a polyol blend. In some embodiments, the polyol blend may include roughly 15% of a fire retardant, such as TCPP. The B side also consisted of 3 catalysts, a surfactant (e.g., Vorasurf™ 504), a blowing agent (e.g., Pentane), and water. The B side had roughly 108.75 parts such that a mixture of the A side and B side materials resulted in a mixture with roughly 283.20 parts. The resulting foam product has an index of roughly 3.00 and a ratio of 1.60.

A low density formulation that produces a roughly 2.0 inch foam core may be as follows:

| Component | Parts |
| --- | --- |
| Polyol | 100 |
| Cat 1 | 5.0 |
| Cat 2 | 0.45 |
| Cat 3 | 0.4 |
| Surfactant | 2.0 |
| Fire Retardant | 12.00 |
| Pentane 50/50 i/n | 23.00 |
| Water | 0.4 |
| Total "B" | 143.25 |
| Total "A" (isocyanate) | 179.24 |
| Total A + B | 322.49 |
| Index | 2.7 |
| Ratio | 1.25 |
| Total Batch Size (g) | 198.26 |

In the table above, the A side material comprised or consisted of an isocyanate that included roughly 179.24 parts. The B side material consisted of roughly 100 parts of a polyol blend. The B side also consisted of 3 catalysts, a surfactant, a fire retardant (e.g., TCPP), a blowing agent (e.g., Pentane), and water. The B side had roughly 143.25 parts such that a mixture of the A side and B side materials resulted in a mixture with roughly 322.49 parts. The resulting foam product has an index of roughly 2.70 and a ratio of 1.25.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the glass fiber" includes reference to one or more glass fibers and equivalents thereof known to those skilled in the art, and so forth. The invention has now been described in detail for the purposes of clarity and understanding. However, it will be appreciated that certain changes and modifications may be practice within the scope of the appended claims.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A thermoplastic prepreg product comprising:
   a thermoplastic prepreg that forms a bottom layer of the thermoplastic prepreg product, the thermoplastic prepreg having a length and a width and the thermoplastic prepreg including:
      a fabric, mat, or web of fibers, in which the fibers have an average length of 0.5 inches or greater; and
      a thermoplastic material that is impregnated within the fabric, mat, or web of fibers; and
   a foam core positioned atop the thermoplastic prepreg and bonded to the thermoplastic prepreg so that the foam core extends across the length and width of the thermoplastic prepreg;
   wherein the thermoplastic prepreg has a surface having a mean roughness of at least 5 micrometers at an interface between the thermoplastic prepreg and the foam core.

2. The thermoplastic prepreg product of claim 1, further comprising a second thermoplastic prepreg that is positioned atop the foam core and bonded to the foam core such that the foam core is sandwiched between opposing thermoplastic prepreg layers, the second thermoplastic prepreg extending across a length and width of the foam core.

3. The thermoplastic prepreg product of claim 1, wherein the foam core is reacted from an isocyanate and a polyol blend, and wherein the foam core includes a blowing agent and a fire retardant.

4. The thermoplastic prepreg product of claim 3, wherein the foam core consists of polyisocyanurate foam having a foam density of 2 pounds per cubic feet (pcf) or more, an R-value of at least 4.0 per inch, and a compressive strength of at least 25 pounds per square inch (psi).

5. The thermoplastic prepreg product of claim 1, wherein the thermoplastic material is fully impregnated through the fabric, mat, or web of fibers and forms a barrier between the fabric, mat, or web of fibers and the foam core such that foam material of the foam core does not impregnate or penetrate into fibers of the fabric, mat, or web of fibers.

6. The thermoplastic prepreg product of claim 1, further comprising a primer positioned between the thermoplastic prepreg and the foam core that adheres the thermoplastic prepreg to the foam core.

7. The thermoplastic prepreg product of claim 1, further comprising a thin adhesive film positioned between the thermoplastic prepreg and the foam core, the thin adhesive film promoting bonding between the thermoplastic prepreg and the foam core.

8. The thermoplastic prepreg product of claim 1, wherein the thermoplastic material consists essentially of polyamide, and wherein the polyamide is adhered to the foam core without using a primer or other adhesion promoter.

9. The thermoplastic prepreg product of claim 1, wherein the thermoplastic material is partially impregnated within the fabric, mat, or web of fibers such that the thermoplastic material is impregnated within a first portion of fibers of the fabric, mat, or web of fibers and a second portion of fibers of the fabric, mat, or web of fibers is free of the thermoplastic material, and wherein a foam material of the foam core impregnates the second portion of fibers of the fabric, mat, or web of fibers.

10. The thermoplastic prepreg product of claim 1, wherein the fabric, mat, or web of fibers include glass fibers, carbon fibers, basalt fibers, metal fibers, ceramic fiber, natural fibers, synthetic organic fibers, aramid fibers, inorganic fibers, or combinations thereof.

11. The thermoplastic prepreg product of claim 1, wherein the thermoplastic material comprises polyamides, polyethylene terephthalate (PET), polybutylene terephthalate (PBT), polycarbonate (PC), thermoplastic polyurethane (TPU), poly(methyl methacrylate) (PMMA), or combinations thereof.

12. The thermoplastic prepreg product of claim 1, wherein the thermoplastic prepreg has a void content of less than 3%.

13. The thermoplastic prepreg product of claim 3, wherein the foam core consists of polyurethane foam having a foam density of 2 pounds per cubic feet (pcf) or less, an R-value of at least 5.7 per inch, and a compressive strength of at least 20 pounds per square inch (psi).

14. The thermoplastic prepreg product of claim 1, wherein the foam core is comprised of a foamed polymer material.

15. The thermoplastic prepreg product of claim 14, wherein the foamed polymer material includes polystyrene, polyolefin, polyester, polyimide, polymethacrylamide, or phenolic foam.

16. The thermoplastic prepreg product of claim 1, wherein the fabric, mat, or web of fibers is melt impregnated with one or more thermoplastic resins.

17. The thermoplastic prepreg product of claim 16, wherein the one or more thermoplastic resins include polypropylene (PP), high-density polyethylene (HDPE), polyamides, polyethylene terephthalate (PET), polybutylene terephthalate (PBT), polycarbonate (PC), polyphthalamide (PPA), acrylonitrile-butadiene-styrene (ABS), PC/ABS, thermoplastic polyurethane (TPU), polyphenylene sulfide (PPS), acetal (polyoxymethylene or POM), polyethyleneimine (PEI), polyether ether ketone (PEEK), polyacrylonitrile, copolyacrylonitriles, or combinations thereof.

18. The thermoplastic prepreg product of claim 1, wherein the thermoplastic material is formed via in situ polymerization of monomers or oligomers.

19. The thermoplastic prepreg product of claim 18, wherein greater than 90% of the monomers or oligomers react to form the thermoplastic material.

20. A thermoplastic prepreg product comprising:
a thermoplastic prepreg that forms a bottom layer of the thermoplastic prepreg product, the thermoplastic prepreg having a length and a width and the thermoplastic prepreg including:
a fabric, mat, or web of fibers, in which the fibers have an average length of 0.5 inches or greater; and
a thermoplastic material that is impregnated within the fabric, mat, or web of fibers; and
a foam core positioned atop the thermoplastic prepreg and bonded to the thermoplastic prepreg so that the foam core extends across the length and width of the thermoplastic prepreg;
wherein the thermoplastic prepreg has a void content of less than 3%.

21. The thermoplastic prepreg product of claim 20, further comprising a second thermoplastic prepreg that is positioned atop the foam core and bonded to the foam core such that the foam core is sandwiched between opposing thermoplastic prepreg layers, the second thermoplastic prepreg extending across a length and width of the foam core.

22. The thermoplastic prepreg product of claim 20, wherein the foam core is reacted from an isocyanate and a polyol blend, and wherein the foam core includes a blowing agent and a fire retardant.

23. The thermoplastic prepreg product of claim 22, wherein the foam core consists of polyisocyanurate foam having a foam density of 2 pounds per cubic feet (pcf) or more, an R-value of at least 4.0 per inch, and a compressive strength of at least 25 pounds per square inch (psi).

24. The thermoplastic prepreg product of claim 20, wherein the thermoplastic material is fully impregnated through the fabric, mat, or web of fibers and forms a barrier between the fabric, mat, or web of fibers and the foam core such that foam material of the foam core does not impregnate or penetrate into fibers of the fabric, mat, or web of fibers.

25. The thermoplastic prepreg product of claim 20, further comprising a primer positioned between the thermoplastic prepreg and the foam core that adheres the thermoplastic prepreg to the foam core.

26. The thermoplastic prepreg product of claim 20, further comprising a thin adhesive film positioned between the thermoplastic prepreg and the foam core, the thin adhesive film promoting bonding between the thermoplastic prepreg and the foam core.

27. The thermoplastic prepreg product of claim 20, wherein the thermoplastic material consists essentially of polyamide, and wherein the polyamide is adhered to the foam core without using a primer or other adhesion promoter.

28. The thermoplastic prepreg product of claim 20, wherein the fabric, mat, or web of fibers include glass fibers, carbon fibers, basalt fibers, metal fibers, ceramic fiber, natural fibers, synthetic organic fibers, aramid fibers, inorganic fibers, or combinations thereof.

29. The thermoplastic prepreg product of claim 20, wherein the thermoplastic material comprises polyamides, polyethylene terephthalate (PET), polybutylene terephthalate (PBT), polycarbonate (PC), thermoplastic polyurethane (TPU), poly(methyl methacrylate) (PMMA), or combinations thereof.

30. The thermoplastic prepreg product of claim 22, wherein the foam core consists of polyurethane foam having a foam density of 2 pounds per cubic feet (pcf) or less, an R-value of at least 5.7 per inch, and a compressive strength of at least 20 pounds per square inch (psi).

31. The thermoplastic prepreg product of claim 20, wherein the foam core is comprised of a foamed polymer material.

32. The thermoplastic prepreg product of claim 31, wherein the foamed polymer material includes polystyrene, polyolefin, polyester, polyimide, polymethacrylamide, or phenolic foam.

33. The thermoplastic prepreg product of claim 20, wherein the fabric, mat, or web of fibers is melt impregnated with one or more thermoplastic resins.

34. The thermoplastic prepreg product of claim 33, wherein the one or more thermoplastic resins include polypropylene (PP), high-density polyethylene (HDPE), polyamides, polyethylene terephthalate (PET), polybutylene terephthalate (PBT), polycarbonate (PC), polyphthalamide (PPA), acrylonitrile-butadiene-styrene (ABS), PC/ABS, thermoplastic polyurethane (TPU), polyphenylene sulfide (PPS), acetal (polyoxymethylene or POM), polyethyleneimine (PEI), polyether ether ketone (PEEK), polyacrylonitrile, copolyacrylonitriles, or combinations thereof.

35. The thermoplastic prepreg product of claim 20, wherein the thermoplastic material is formed via in situ polymerization of monomers or oligomers.

36. The thermoplastic prepreg product of claim 35, wherein greater than 90% of the monomers or oligomers react to form the thermoplastic material.

37. A thermoplastic prepreg product comprising:
a thermoplastic prepreg that forms a bottom layer of the thermoplastic prepreg product, the thermoplastic prepreg having a length and a width and the thermoplastic prepreg including:
a fabric, mat, or web of fibers, in which the fibers have an average length of 0.5 inches or greater; and
a thermoplastic material that is impregnated within the fabric, mat, or web of fibers; and
a foam core positioned atop the thermoplastic prepreg and bonded to the thermoplastic prepreg so that the foam core extends across the length and width of the thermoplastic prepreg;
wherein the thermoplastic material consists essentially of polyamide, and wherein the polyamide is adhered to the foam core without using a primer or other adhesion promoter.

38. The thermoplastic prepreg product of claim 37, further comprising a second thermoplastic prepreg that is positioned atop the foam core and bonded to the foam core such that the foam core is sandwiched between opposing thermoplastic prepreg layers, the second thermoplastic prepreg extending across a length and width of the foam core.

39. The thermoplastic prepreg product of claim 37, wherein the foam core is reacted from an isocyanate and a polyol blend, and wherein the foam core includes a blowing agent and a fire retardant.

40. The thermoplastic prepreg product of claim 39, wherein the foam core consists of polyisocyanurate foam having a foam density of 2 pounds per cubic feet (pcf) or more, an R-value of at least 4.0 per inch, and a compressive strength of at least 25 pounds per square inch (psi).

41. The thermoplastic prepreg product of claim 37, wherein the thermoplastic material is fully impregnated through the fabric, mat, or web of fibers and forms a barrier between the fabric, mat, or web of fibers and the foam core such that foam material of the foam core does not impregnate or penetrate into fibers of the fabric, mat, or web of fibers.

42. The thermoplastic prepreg product of claim 37, wherein the thermoplastic material is partially impregnated within the fabric, mat, or web of fibers such that the thermoplastic material is impregnated within a first portion of fibers of the fabric, mat, or web of fibers and a second portion of fibers of the fabric, mat, or web of fibers is free of the thermoplastic material, and wherein a foam material of the foam core impregnates the second portion of fibers of the fabric, mat, or web of fibers.

43. The thermoplastic prepreg product of claim 37, wherein the fabric, mat, or web of fibers include glass fibers, carbon fibers, basalt fibers, metal fibers, ceramic fiber, natural fibers, synthetic organic fibers, aramid fibers, inorganic fibers, or combinations thereof.

44. The thermoplastic prepreg product of claim 37, wherein the polyamide comprises polyamide 6, polyamide 12, or combinations thereof.

45. The thermoplastic prepreg product of claim 37, wherein the thermoplastic prepreg has a void content of less than 3%.

46. The thermoplastic prepreg product of claim 39, wherein the foam core consists of polyurethane foam having a foam density of 2 pounds per cubic feet (pcf) or less, an R-value of at least 5.7 per inch, and a compressive strength of at least 20 pounds per square inch (psi).

47. The thermoplastic prepreg product of claim 38, wherein the foam core is comprised of a foamed polymer material.

48. The thermoplastic prepreg product of claim 47, wherein the foamed polymer material includes polystyrene, polyolefin, polyester, polyimide, polymethacrylamide, or phenolic foam.

49. The thermoplastic prepreg product of claim 37, wherein the thermoplastic material is formed via in situ polymerization of monomers or oligomers.

50. The thermoplastic prepreg product of claim 49, wherein greater than 90% of the monomers or oligomers react to form the thermoplastic material.

51. A thermoplastic prepreg product comprising:
a thermoplastic prepreg that forms a bottom layer of the thermoplastic prepreg product, the thermoplastic prepreg having a length and a width and the thermoplastic prepreg including:
a fabric, mat, or web of fibers, in which the fibers have an average length of 0.5 inches or greater; and
a thermoplastic material that is impregnated within the fabric, mat, or web of fibers; and
a foam core positioned atop the thermoplastic prepreg and bonded to the thermoplastic prepreg so that the foam core extends across the length and width of the thermoplastic prepreg;
wherein the thermoplastic material is partially impregnated within the fabric, mat, or web of fibers such that the thermoplastic material is impregnated within a first portion of fibers of the fabric, mat, or web of fibers and a second portion of fibers of the fabric, mat, or web of fibers is free of the thermoplastic material, and wherein a foam material of the foam core impregnates the second portion of fibers of the fabric, mat, or web of fibers.

52. The thermoplastic prepreg product of claim 51, further comprising a second thermoplastic prepreg that is positioned atop the foam core and bonded to the foam core such that the foam core is sandwiched between opposing thermoplastic prepreg layers, the second thermoplastic prepreg extending across a length and width of the foam core.

53. The thermoplastic prepreg product of claim 51, wherein the foam core is reacted from an isocyanate and a polyol blend, and wherein the foam core includes a blowing agent and a fire retardant.

54. The thermoplastic prepreg product of claim 53, wherein the foam core consists of polyisocyanurate foam having a foam density of 2 pounds per cubic feet (pcf) or more, an R-value of at least 4.0 per inch, and a compressive strength of at least 25 pounds per square inch (psi).

55. The thermoplastic prepreg product of claim 51, wherein the thermoplastic material consists essentially of polyamide, and wherein the polyamide is adhered to the foam core without using a primer or other adhesion promoter.

56. The thermoplastic prepreg product of claim 51, wherein the fabric, mat, or web of fibers include glass fibers, carbon fibers, basalt fibers, metal fibers, ceramic fiber, natural fibers, synthetic organic fibers, aramid fibers, inorganic fibers, or combinations thereof.

57. The thermoplastic prepreg product of claim 51, wherein the thermoplastic material comprises polyamides, polyethylene terephthalate (PET), polybutylene terephthalate (PBT), polycarbonate (PC), thermoplastic polyurethane (TPU), poly(methyl methacrylate) (PMMA), or combinations thereof.

58. The thermoplastic prepreg product of claim 53, wherein the foam core consists of polyurethane foam having a foam density of 2 pounds per cubic feet (pcf) or less, an R-value of at least 5.7 per inch, and a compressive strength of at least 20 pounds per square inch (psi).

59. The thermoplastic prepreg product of claim 51, wherein the foam core is comprised of a foamed polymer material.

60. The thermoplastic prepreg product of claim 59, wherein the foamed polymer material includes polystyrene, polyolefin, polyester, polyimide, polymethacrylamide, or phenolic foam.

61. The thermoplastic prepreg product of claim 51, wherein the fabric, mat, or web of fibers is melt impregnated with one or more thermoplastic resins.

62. The thermoplastic prepreg product of claim 61, wherein the one or more thermoplastic resins include polypropylene (PP), high-density polyethylene (HDPE), polyamides, polyethylene terephthalate (PET), polybutylene terephthalate (PBT), polycarbonate (PC), polyphthalamide (PPA), acrylonitrile-butadiene-styrene (ABS), PC/ABS, thermoplastic polyurethane (TPU), polyphenylene sulfide (PPS), acetal (polyoxymethylene or POM), polyethyleneimine (PEI), polyether ether ketone (PEEK), polyacrylonitrile, copolyacrylonitriles, or combinations thereof.

63. The thermoplastic prepreg product of claim 51, wherein the thermoplastic material is formed via in situ polymerization of monomers or oligomers.

64. The thermoplastic prepreg product of claim 63, wherein greater than 90% of the monomers or oligomers react to form the thermoplastic material.

65. The thermoplastic prepreg product of claim 11, wherein the polyamides comprise polyamide 6, polyamide 12, or a combination thereof.

66. The thermoplastic prepreg product of claim 15, wherein the polystyrene comprises XPS or EPS.

67. The thermoplastic prepreg product of claim 15, wherein the polyolefin comprises PE foam, PP foam, or EPDM foam.

68. The thermoplastic prepreg product of claim 17, wherein the copolyacrylonitriles comprise poly(styrene-co-acrylonitrile) (SAN).

69. The thermoplastic prepreg product of claim 29, wherein the polyamides comprise polyamide 6, polyamide 12, or a combination thereof.

70. The thermoplastic prepreg product of claim 32, wherein the polystyrene comprises XPS or EPS.

71. The thermoplastic prepreg product of claim 32, wherein the polyolefin comprises PE foam, PP foam, or EPDM foam.

72. The thermoplastic prepreg product of claim 34, wherein the copolyacrylonitriles comprise poly(styrene-co-acrylonitrile) (SAN).

73. The thermoplastic prepreg product of claim 48, wherein the polystyrene comprises XPS or EPS.

74. The thermoplastic prepreg product of claim 48, wherein the polyolefin comprises PE foam, PP foam, or EPDM foam.

75. The thermoplastic prepreg product of claim 57, wherein the polyamides comprise polyamide 6, polyamide 12, or a combination thereof.

76. The thermoplastic prepreg product of claim 60, wherein the polystyrene comprises XPS or EPS.

77. The thermoplastic prepreg product of claim 60, wherein the polyolefin comprises PE foam, PP foam, or EPDM foam.

78. The thermoplastic prepreg product of claim 62, wherein the copolyacrylonitriles comprise poly(styrene-co-acrylonitrile) (SAN).

* * * * *